March 12, 1957 H. KARLBY ET AL 2,784,551
VORTICAL FLOW GAS TURBINE WITH CENTRIFUGAL FUEL INJECTION
Filed June 1, 1951 5 Sheets-Sheet 4
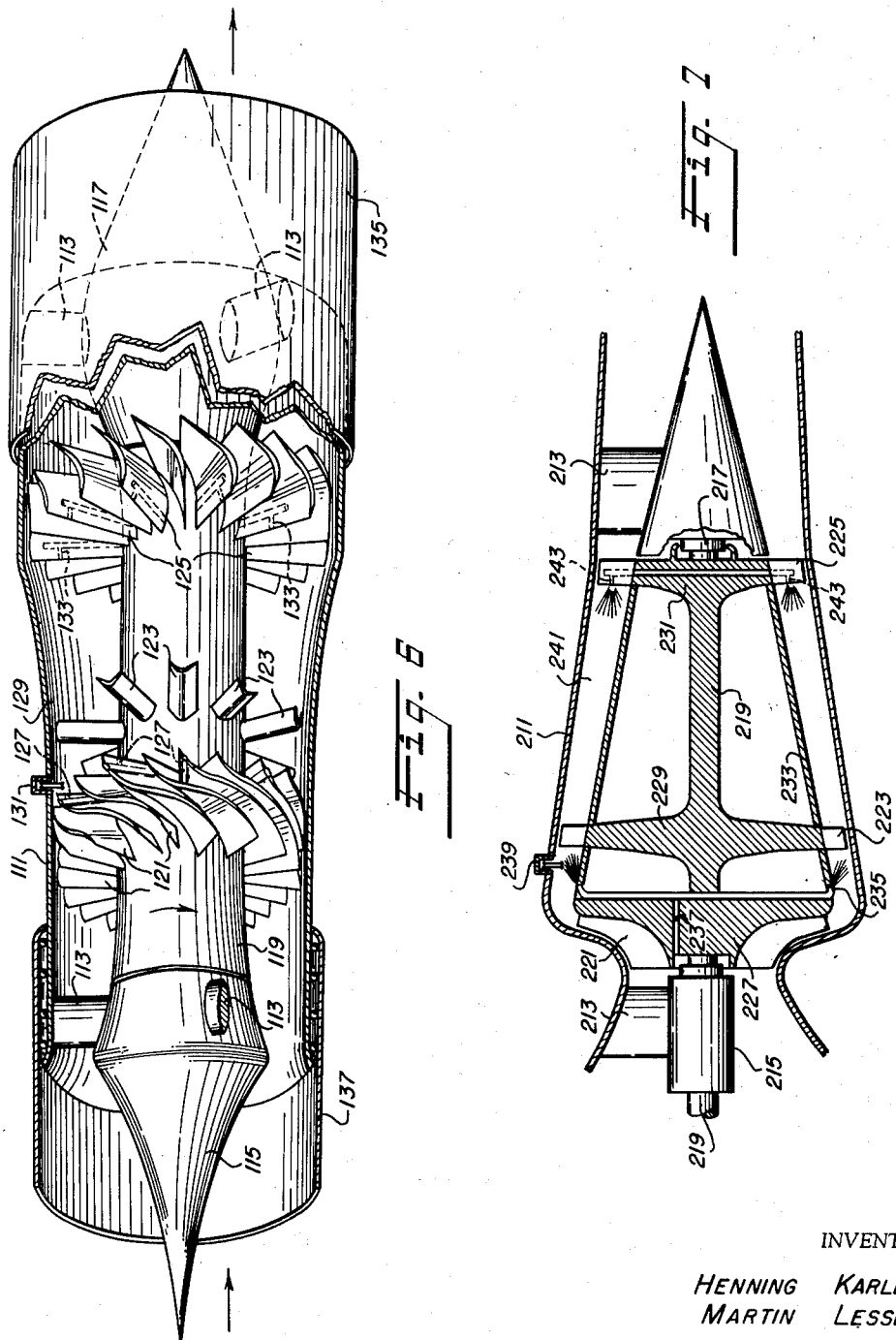
INVENTORS
HENNING KARLBY
MARTIN LESSEN
BY Strauch, Nolan & Diggins
ATTORNEYS INVENTORS
HENNING KARLBY
MARTIN LESSEN
BY Strauch, Nolan & Diggins
ATTORNEYS

United States Patent Office 2,784,551
Patented Mar. 12, 1957

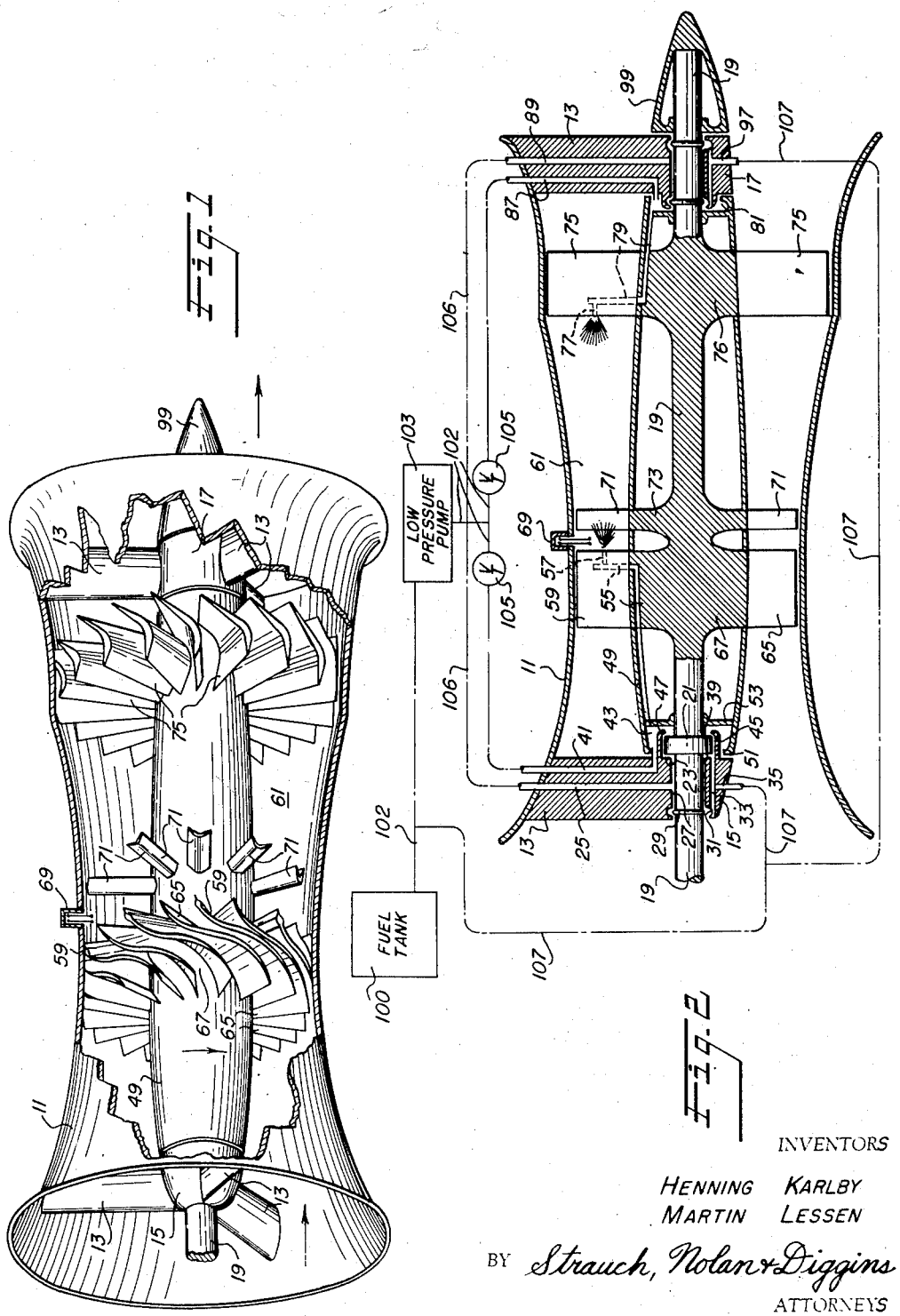

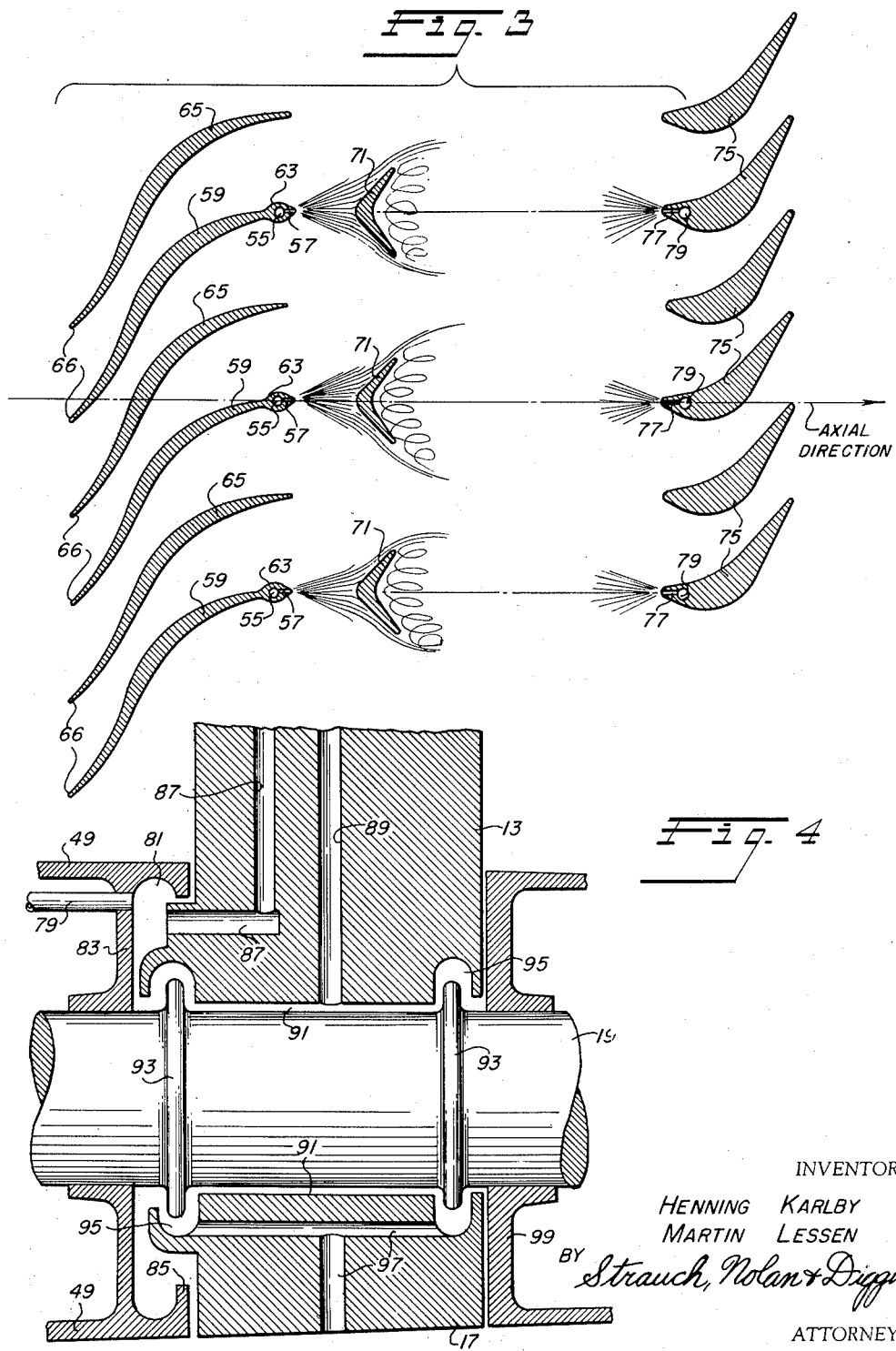

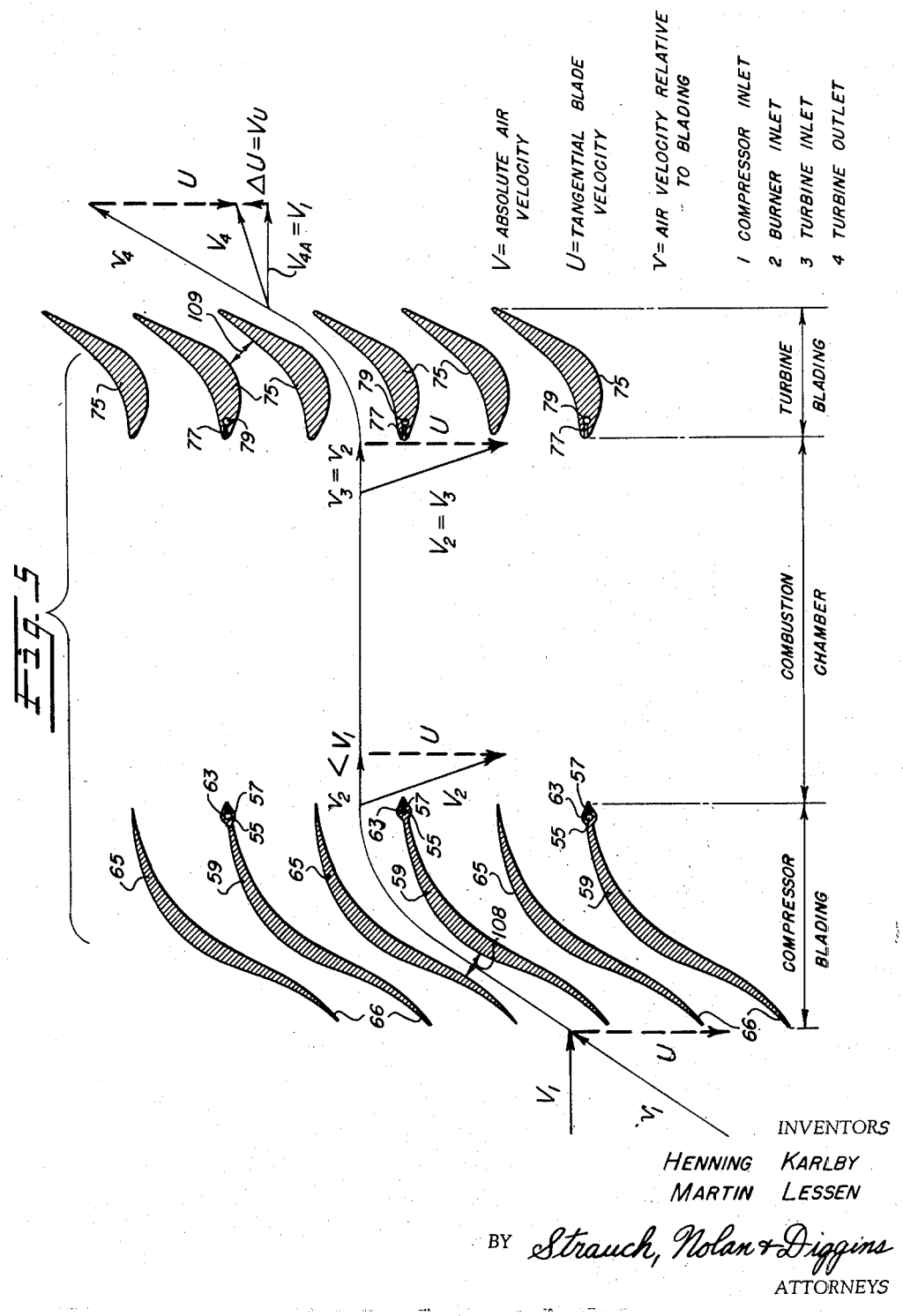

2,784,551

VORTICAL FLOW GAS TURBINE WITH CENTRIFUGAL FUEL INJECTION

Henning Karlby, Pittsburgh, and Martin Lessen, Bellefonte, Pa., assignors of one-sixth to Orin M. Raphael and one-sixth to E. George Zilliac Application June 1, 1951, Serial No. 229,406

9 Claims. (Cl. 60—35.6)

Our present invention relates to heat engines which may be used as stationary power plants, for jet propulsion of planes, as gas producers delivering to free output turbines, and comprises improvements in heat engines of the type disclosed in the co-pending application of Henning Karlby, Serial No. 75,139, filed February 8, 1949.

In said co-pending application a continuous flow heat engine is disclosed in which propulsion is effected by the combustion and passage of propelling gases in a single confined vortical path around the axis of rotation of a rotor. In our present invention a primary improvement over the disclosure of said co-pending application comprises utilization of free vortical flow and combustion in continuous heat engines.

In the commonly used gas turbine power plants or continuous flow type heat engines it is the practice to provide stationary combustion chambers between compressor and turbine rotors in supporting casing structures, in which the combustion chambers are not integrated with the compressor and turbine elements. Such prior power plants utilize compressors of positive or non-positive type, combustion chambers following industrial furnace practice, and turbines of the steam type, to drive the compressor. Usually separate pumps for fuel and lubricant, are employed.

Exchange of useful or mechanical energy between fluid flow and rotors in such arrangements takes place by change of the whirl or vortex motion of the fluid as a whole. When the fluid receives a whirl from the compressor rotor, useful energy is imparted to it, partly as a pressure rise and partly as a velocity rise. In a compressor for a conventional gas turbine power plant velocity imparted to the fluid as such is undesirable as an end product. Accordingly it has been the practice in compressors for such plants to so far as possible diffuse tangential or whirl velocities into additional pressure rises by use of stators.

The final compressor stator generally acts both to diffuse and to direct the flow into the stationary combustion chamber. Since the function of the stationary combustion chamber is to liberate heat by efficient combustion, the flow velocity through the chamber in such prior plants is made as low as possible. In the first turbine stator of such prior plants a whirl is imparted to the fluid before it enters in the first turbine stage.

The use of stators in such prior constructions introduces mechanical complications and expense, which it is a primary object of our present invention to eliminate. Many unsuccessful prior arrangements of statorless gas turbines and continuous heat engines have been proposed, including the ancient Hero's aeolipile, and variations of the Nernst heat engines proposed about 1900, the first of which consisted of a hollow shaft in bearings, one end of the shaft admitting air, the other joined to two hollow radial arms each having tangential nozzles at their tips. Air entering the shaft was compressed by passage out radially, heated by combustion near the tips, and expelled as propulsive tangential jets through the nozzles. Nernst also proposed for a gas producer a hollow shaft in the form of a "crank" in which air was compressed centrifugally in the "out" arm of the crank, heated by combustion in the parallel portion of the crank and passed back through the "in" arm, thereby driving the compressor arm as a radial flow turbine, finally issuing as a hot high speed stream of gas.

In the recent U. S. Patent No. 2,514,874 to Kollsman, a multiplicity of Nernst "cranks" in the form of a conventional statorless centrifugal compressor are arranged back to back on the same shaft with a statorless radial flow turbine inside a common casing. In this arrangement combustion is proposed in divided short transition spaces between the two rotors, which is wholly inadequate for practical power delivery purposes.

In Walton U. S. Patent 2,410,538 helical ducts are disclosed between a shaft and open ended co-axial rotating shell. The individual ducts converge to a throat and thereafter diverge to the outlet end of the device. Fuel is injected centrifugally at the throat. This arrangement is practically inoperative for various reasons including the fact that at flow velocities in the combustion zone at which combustion would be effected, stabilized flame could not be developed.

In our present invention we eliminate the foregoing defects and disadvantages of the prior turbo-compressor and proposed statorless types of heat engines by providing gas turbine power plants or heat engines comprising a non-rotatable casing in which compressor and turbine assemblies are rotatably mounted, preferably on the same shaft, but not necessarily of the same diameter. A combustion space is provided inside the common casing between the rotating compressor and turbine assembly, with no stationary flow directing or stator elements, other than the confining casing. There accordingly is no whirl removal and re-introduction between the compressor and turbine assemblies. Fuel is preferably introduced from the rotating compressor blading, in a direction essentially downstream from compressor blades, and in a direction essentially upstream from the turbine blades in possible modifications. The mixture of fuel and air passes through the combustion space in free vortical movement around the rotor axis, providing long mixing, ripening and combustion paths in which efficient flame propagation takes place in a relatively short axial distance between the compressor and turbine assembly. The gases leave the compressor rotor axially relative to the rotating shaft, pass through the combustion space and enter the turbine rotor without passing through stators.

Our invention may be embodied in direct linear propulsion units similar to present turbo-jet units, or may be used as gas producers which in turn may be used for driving free output turbines. The available energy may also be entirely absorbed by the turbine, and the excess above the power required to operate the unit made available as mechanical shaft power.

It is accordingly a primary object of our invention to provide a substantially simplified turbo-compressor type of gas turbine power plant or heat engine providing dependable operation, smaller weight and bulk for a given power output, and lower manufacturing costs.

If desired, the pumps for fuel, coolant and lubricant may also be integrated with the structure to serve all its own pumping needs for fuel, coolant and lubricant, and such may also be advantageously incorporated in conventional gas turbines. It is accordingly a further object of the present invention to provide a completely integrated gas turbine power plant having in effect only one rotating assembly which, along its length, serves in cooperation with the surrounding casing, as air compressor, fuel pump, fuel injector, combustion chamber, turbine, lubricant pump and coolant pump.

Further objects will appear from the following description of preferred embodiments of the invention and from the scope of the appended claims.

As shown in the drawings:

Figure 1 is a perspective view, partially in section of a preferred embodiment of the essential elements of our invention as applied to a shaft power plant.

Figure 2 is a more or less diagrammatic view of the invention illustrated in Figure 1 partially in longitudinal section, and with parts broken away, showing our preferred fuel supply and lubricating system.

Figure 3 is an unrolled blading section at mean rotor diameter of the form of invention disclosed in Figure 1, illustrating one method of fuel injection through blading, and an arrangement of flame holders which may be used.

Figure 4 is a fragmental sectional view of the rear bearing and fuel supply arrangement, with bearing clearances exaggerated, for the form of invention illustrated in Figures 1 to 3 which may be applied to other types of gas turbines.

Figure 5 is a velocity vector diagram of the form of invention shown in Figures 1–4.

Figure 6 is a perspective view, partially in section of our invention as applied to a linear propulsion unit adapted for missiles and aircraft propulsion at sub-sonic, sonic and super-sonic speeds.

Figure 7 is a schematic disclosure of our invention utilizing conventional single stage centrifugal compressor and single stage turbine blading without stators.

Figure 8:
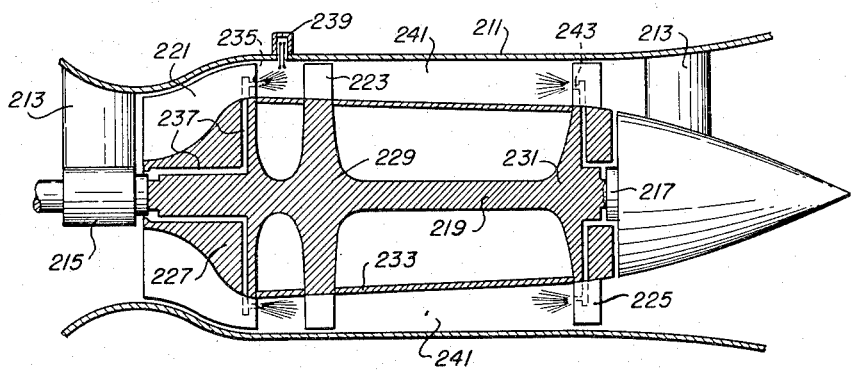
Figure 8 is a schematic disclosure of our invention utilizing a mixed flow compressor and single stage turbine.

As shown in Figures 1 and 2, our preferred shaft power unit comprises a non-rotatable shell 11 suitably supported in a manner not shown. Radial struts 13, preferably three in number spaced angularly at 120°, extend inwardly from casing 11 to forward and rear shaft supporting bearings 15 and 17 which support power shaft 19. Shaft 19 is provided at its forward end with thrust collar 21 the forward face of which reacts against thrust face 23 of bearing 15. To lubricate and cool bearing 15, fuel is circulated under pressure in a manner hereinafter described through duct 25 in a strut 13 and clearance space 27 in bearing 15. The fuel which flows forwardly in space 27 is thrown outwardly by slinger 29 on shaft 19 and passes through annular channel 31 and ducts 33 and 35. The fuel which flows rearwardly in space 27 passes outwardly through channels 39 lubricating the bearing face of thrust collar 21 and passes back through channel 33 into duct 35.

Primary fuel for combustion is fed through duct 41 of strut 13 and discharges into chamber 43 surrounding rearwardly extending sleeve projection 45 of bearing 15. The rear end of projection 45 is provided with an inwardly turned dam or lip section 47 to trap fuel lubricant thrown outwardly by collar 21. The outer wall of chamber 43 is formed by the forward end of streamlined shell 49 which surrounds shaft 19 to the rear of struts 13 to provide a streamlined flow surface and a relatively low temperature zone around the shaft and bearings. The forward end of shell 49 is provided with the annular fuel trapping lip 51, and supported for rotation with shaft 19 by plate 53 which forms the rear wall of chamber 43.

Fuel from chamber 43 is forced outward by centrifugal force and through ducts 55 and nozzles 57 within compressor blades 59 (Figs. 2 and 3) into the combustion chamber 61. Blades 59 are enlarged as shown at 63 (Fig. 5) for the purpose of creating mixing turbulence in the air stream at the fuel nozzles 57. Disposed between blades 59 are compressor blades 65 which are not provided with fuel ducts and nozzles. Blades 59 and 65 are provided with sharp leading edges 66 to accept high velocity inflowing air and are shaped to form a diffusion or compression zone as shown in Figs. 3 and 5. These blades are integrally formed or otherwise suitably mounted on rotor hub 67 (Figs. 1 and 2) which is integrally formed or otherwise suitably mounted on shaft 19. In operation the diffusing channels between blades 59 and 65 increase the pressure of the inflowing air to provide the desired operating pressure for combustion chamber 61.

Adjacent the downstream end of the compressor igniters 69 of any well known construction extend through casing 11 into position to ignite the projected fuel mixture. Preferably, although not necessarily, radially extending channel shaped flameholders 71 of well known construction are mounted in alignment with the downstream edges of blades 59 and with nozzles 57. Flameholders 71 when used, are supported on hub 73 formed integrally with or secured to shaft 19 so they rotate with the shaft and blades 59 and 65. The flameholders increase the capacity of a combustion chamber of given size, and for the same fuel capacity permit use of a shorter combustion chamber.

Instead of being mounted on casing 11, igniters 69 may be mounted on and rotatable with the compressor, or flameholders 71 when used.

The fuel and air mixture is projected centrifugally at high velocity from the compressor into combustion chamber 61 in a whirling vortex, is ignited and as combustion proceeds progresses through chamber 61 in vortical paths to the inlet of the turbine formed of blades 75 carried by hub 76 formed integrally with or otherwise secured to shaft 19. Blades 75 are shaped to provide discharge nozzle channels in which kinetic energy of the whirling gaseous vortex leaving chamber 61 is converted into rotation of rotor and shaft assembly to the desired extent. If desired, a supplemental fuel supply may be projected upstream into chamber 61 through nozzles 77 in the inlet edges of certain of blades 75. When used, nozzles 77 are fed by means of ducts 79 formed in the blades which communicate with chamber 81 (see Fig. 4) formed in shell 49 to the rear of the supporting wall or web 83 which mounts the rear of the shell on shaft 19. Annular lip 85 of shell 49 traps the fuel thrown outward centrifugally and establishes a feeding level for ducts 79. Fuel is fed to chamber 81 through ducts 87 formed in a strut 13 supporting rear bearing 17. Fuel serving as a coolant and bearing lubricant is also fed to rear bearing 17 for shaft 15 through duct 89 and clearance space 91, and the excess is thrown outward by slingers 93 caught in annular channels 95 and is returned to the fuel circulating systems through ducts 97 formed in rear bearing 17. A streamlined protecting shell 99 is mounted on and rotatable with the rear end of shaft 19. It will be understood that the bearing clearances shown are exaggerated for the purposes of illustration.

As shown diagrammatically in Fig. 2 the fuel supply may be fed from a fuel tank 100 through lines 102, low pressure pump 103, throttle or control valves 105, to fuel supply ducts 41 and 87, and to nozzles 57 and 77. In this way a throttle control rather than the usual pump control system is provided for the fuel supply. As mentioned hereinbefore, the pump 103 may be driven from power taken off the power shaft 19 by any well-known mechanical power transfer means.

Fuel utilized as bearing lubricant and coolant is fed by pump 103 through lines 106 to ducts 25 and 89, and is returned from ducts 35 and 97 through lines 107 to the inlet side of pump 103, or if desired, back to the fuel tank.

Any suitable starting arrangement (not shown) may be provided, as for example a starting motor on the forward end of shaft 19 to rotate the shaft and rotor assembly until the fuel mixture is ignited and the turbine takes over the driving of shaft 19.

Operation

The operation of the form of the invention illustrated in Figs. 1-4 is shown by the vector diagram of Fig. 5. In this diagram V (capital) is used for "absolute" air velocity, or for velocity with respect to the earth or the ground. U (capital) indicates the tangenital or rotational velocity of the rotor, at the radius considered, while v (lower case) is the "relative" air velocity, with respect to the rotor parts at tangential velocity U.

In the velocity vector diagram of Fig. 5, which is for the stationary (or shaft) power plant only, air enters axially at the absolute velocity $V_1$ into the diffusing or compression rotor blading, which turns at velocity U (no subscript as U is common to all rotor parts at the same radius), so the relative air velocity between air and rotor is $v_1$ (strictly the vector difference V—U).

The cross-sectional area of the passage between compressor blades is shown for the case where $v_1$ (not $V_1$) is supersonic, that is, while $V_1$ may be about 500 F. P. S. (common practice) and U may be 1600 F. P. S. or better (common practice), their vector difference or $v_1$ (the hypotenuse) is about 1700 F. P. S. This is then the air velocity relative to points on the rotor blading surface and is supersonic, so the proper (supersonic) diffuser duct shape is first contracting and then diverging (the "throat" indicated at 108 having sonic velocity exactly), and this relative velocity $v_1$ decreases throughout the entire passage to the compressor exit velocity $v_2$ (less than $V_1$), which is the same as saying that the air is being brought up to rotor tangential velocity U, very nearly, at the same time as it is being compressed to combustion chamber pressure. In other words, the compressor imparts a monotonically increasing tangential velocity component to the air.

Before proceeding, the adverb "monotonically" used above and hereinafter as a modifier for "increasing" and "decreasing" will be defined as used in and as it relates to the present disclosure. The term "monotonically increasing" herein means increasing without decreasing algebraically and the term "monotonically decreasing" herein means decreasing without increasing algebraically. As an example for further clarifying the term, consider the comparison between a conventional multi-stage compressor having stators or straightening vanes interposed between each consecutive stage of rotor blades and the single-stage, statorless vortical flow compressor used in the present invention. In the former the tangential velocity component imparted to the working fluid by the rotors is diminished to substantially zero as it passes through the stators to the next succesive stage of compression.

A graphical representation of the algebric value of the tangential velocity component would be a curve showing a series of peaks and troughs, the troughs representing the points at which the tangential velocity component decreases to substantially zero while passing through each set of stators. On the other hand, in the vortical flow compressor this tangential velocity component increases without decreasing at any point through the compressor (viz., monotonically) due to the absence of stators, the working fluids being brought up to very nearly the rotor tangential velocity while being compressed. The same explanation applies to the term "monotonically decreasing" relating to the flow through a turbine.

The absolute velocity of the air being the vector sum $V_2=v_2+U$, the air will leave the compressor with an absolute vortical velocity, composed of U and the axial velocity $v_2$, relative to the rotor. The striking feature of this vortical flow is then, that as the flameholders 71, fuel nozzles 57, etc. all turn together, the relative relation between air, fuel and flameholders is being somewhat as if the entire combustion chamber 61 did not turn.

It will be noted that since the fuel is injected centrifugally the amount of fuel injected is controllable by simple throttling without the need for booster pumps or the like, and ample pressure is available to provide thorough atomization and desirable fuel distribution adjacent nozzles. The centrifugal action on the fuel after leaving the nozzles aids in the formation of the combustible mixture.

When entering the turbine blading 75, the gas turns as fast (U) as the turbine does, so their relative velocity is $v_3$ only, which points straight into the blading passage, with no further direction or speedup required. This low relative velocity $v_3$ is increased across the turbine, first to sonic (relative) value at the contraction or "throat" indicated at 109, then to supersonic in the flare portion of the passage, leaving the turbine at exit direction as shown.

The absolute or "ground" velocity of exit gas $V_4$ is then reconstructed by vector addition of $v_4$ and U. $V_4$ may be considered as made up from two components, $V_{4_a}$ in the axial direction, equal to the absolute entry velocity $V_1$, or in other words there is no thrust on the engine because air enters and leaves at the same (axial) velocity. The other component of $V_4$, however, is the absolute tangential air velocity $\Delta U$ or $V_u$, which the entering air did not have. This is the component that actually drives the turbine around, against its load, by "kicking" against the rotor, or by reaction "propulsion" of the rotor. In other language, the gas must, in order to drive the rotor around, leave the turbine "backwards" faster than the turbine turns "forward," or it must have a net "backwards" absolute velocity (relative to the earth). This net "backwards" velocity is the component $V_u$. Thus the absolute tangential velocity decreases monotonically through the turbine.

Modified forms of the invention

As pointed out hereinabove the invention has application to stationary power plants of types other than that shown in the embodiment of Figs. 1-5, and is also adapted for use in linear propulsion plants for missiles or aircraft. Referring now to Figure 6, the invention is schematically illustrated in a preferred form for use as a statorless power plant for missile or aircraft propulsion. In this form of the invention only those portions of the unit differing from the embodiment of Figs. 1-5 will be described in detail, the remainder having been previously described herein in connection with those figures.

In the form of Fig. 6 the power unit comprises the shell 111 non-rotatably mounted in any suitable manner in the missile or aircraft. Radial struts 113 at the forward and after ends of the shell 111 respectively support a supersonic diffuser spike 115 as illustrated, and a bulb or "bullet" member 117, to be explained. As in the first modification of the invention, diffuser 115 and bulb 117 support bearings, not shown, which in turn support a rotatable shaft, not shown, similar to shaft 19. The bearings are lubricated and cooled by fuel introduced through ducts in the struts 113 in a manner previously described.

The rotatable shaft is surrounded by a streamlined shell 119 regidly secured thereto, and supports hubs which carry compressor blades 121, flameholders 123 and turbine blades 125, all in a manner hereinbefore described. The hubs, blades and flameholders are rigidly fixed to the shaft or integral therewith to rotate with it and with each other. Compressor blades 121 are provided between blades with fuel nozzles indicated at 127 so that fuel, supplied under pressure through ducts in the blades, shell 119 and a forward strut 113, is forced out of the nozzles by centrifugal action and into the combustion chamber 129 formed between the compressor and turbine in shell 111. Downstream of the compressor, igniters 131 of any suitable construction are mounted in the shell 111. The igniters 131, however, may also be mounted for rotation on the compressor blades 121 or flameholders 123. Flameholders 123, which may be of any suitable cross-section, are preferably located adjacent the fuel ejecting compressor blades 121. In this manner, ram air entering the forward or upstream end of the unit is compressed in the compressor and emerges from the compressor to be mixed with the fuel spray from the blades 121. The flameholders 123 serve as sheltered combustion zones to initiate and maintain stable combustion throughout combustion chamber 129 as the fuel-air mixture proceeds therethrough in a whirling vortical pattern.

If desired, fuel may also be centrifugally sprayed into combustion chamber 129 in an upstream direction from fuel nozzles indicated at 133 in turbine blades 125, the fuel supplied under pressure to blades 125 in the manner previously described.

As before, the vortically moving combustion gases move down combustion chamber 129 and enter the turbine in the proper flow direction. However, in this modification the turbine takes from the reactive forces of the combustion gases only sufficient energy to drive the compressor, the remainder being used to propel the missile or aircraft forward by the well-known jet principle.

In this connection, a casing or shroud member 135 is slidably mounted on the after end of shell 111 for coaction with bulb 117 to regulate the area of the jet orifice. Since bulb 117 is stationary relative to shell 111 and the aircraft, axial movement of casing 135 on the shell will accomplish any desired regulation of the jet orifice for optimum performance for various flight conditions or for afterburning. The slidable mounting may be accomplished by ball slides, roller tracks or in any other suitable manner, and actuation of the casing is accomplished by any well-known expedient as by a hydraulic or servomotor. As indicated on Figure 6 the power unit may also be equipped, if desired, with an afterburner of any conventional design without substantially altering the illustrated structure.

A similar casing or shroud 137 is slidably mounted on the forward end of shell 111 for coaction with diffuser spike 115. Casing 137 is mounted and actuated in the same manner as after casing 135 and is provided for diffusion of air intake to design conditions forward of the rotor.

Referring now to Fig. 7 a further modified form of the invention is schematically illustrated wherein it is adapted for use in a combination of a conventional centrifugal compressor and single stage turbine, both without stators. This arrangement comprises a non-rotatable shell 211 supported in any suitable manner. Radial struts 213 at the forward and after ends of shell 211 respectively support bearings 215 and 217 which support power shaft 219, corresponding to shaft 19 of the first described form of the invention. Bearings 215 and 217 are lubricated and cooled in the manner previously described. Compressor blades 221, flameholders 223 and turbine blades 225 are respectively rigidly secured to hubs 227, 229 and 231 integral with shaft 219 which is surrounded by streamlined shell 233 rotatable with the shaft. In this form, fuel under pressure is centrifugally sprayed downstream for mixture with the compressed air from nozzles 235 at the after edge of compressor hub 227. This fuel is delivered to nozzles 235 by means of duct 237 in hub 227 which connects with ducting through bearing 215 and a forward strut 213 in the aforesaid manner.

In Fig. 7, entering air is compressed by the single-stage compressor principally due to the centrifugal action thereof and emerges to be mixed with the downstream fuel sprays, whereupon the fuel air mixture is ignited by igniters 239 and stable combustion is maintained by means of flameholders 223, all as hereinbefore described. The burning gases and combustion products thereupon progress through the unobstructed annular combustion space 241 with a vortical motion imparted initially by the rotation of the compressor. The combustion products enter the turbine as explained in connection with Figures 1–5 and impart to it the bulk of their energy. The excess over that needed to drive the compressor being employed to do other work with shaft 219. As in the other modifications turbine blades 225 may be provided with fuel nozzles 243 for providing an upstream fuel spray when desired.

Figure 8 is a modification of the form shown in Fig. 7 wherein a "mixed flow" compressor is employed. In this embodiment the flow is somewhat more axial through the compressor, and the compressor blades 221 are accordingly wider radially as shown. Also, in this embodiment fuel nozzles 235 are located at the after edge of the compressor blades 221, which extend farther aft, rather than in the compressor hub as shown in Fig. 7.

Figure 9:
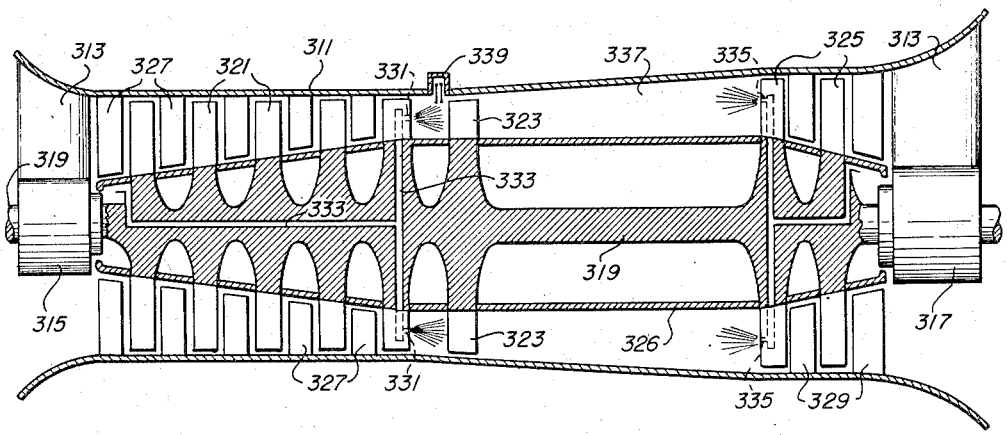
Figure 9 is a schematic disclosure of our invention utilizing a conventional multi-stage compressor and turbine with our vortical combustion chamber and fuel injection arrangements.

Figure 9 illustrates schematically the manner of incorporating our improved vortical flow combustion chamber in a conventional type multi-stage compressor and turbine. In this embodiment the last or after row of compressor stators and the first or forward row of turbine stators are omitted so that a vortical flow in accordance with the invention is imparted to the gases leaving the compressor. As shown, the non-rotatable shell 311 supports forward and after struts 313 which in turn support bearings 315 and 317. Bearings 315 and 317 support shaft 319 upon which are fixed the rotating compressor blades 321, flameholders 323 and turbine blades 325. Also mounted on shaft 319 for rotation therewith is the streamlined shell 326. Forward of the last rotating compressor blade 321 are stages or rows of stators 327 in the conventional manner, while stators 329 are provided after the forward rotating turbine blade 325. In this arrangement fuel is centrifugally injected downstream from the last row of compressor blades 321 through nozzles 331 connecting with duct 333 which is connected to the fuel supply in the previously described manner. Similarly upstream fuel injection may be provided through nozzles 335 in the first row of turbine blades 325.

Air entering shell 311 is compressed in the usual manner except that as it leaves the compressor it is given a vortical motion due to the fact that the last row of compressor blading are rotors. The compressed air is then mixed with the fuel spray as before in an unobstructed annular combustion chamber 337 and ignited by igniters 339 whereupon the products of combustion flow vortically into first row of turbine blading and thereafter proceed through the turbine in the usual manner.

It will be understood from the foregoing that we have provided novel vortical combustion flow gas turbine power plants and heat engines adapted for a wide variety of uses. The simplified construction not only provides for more efficient operation, but also for smaller weight and bulk for any given power output. In addition, the embodiments disclosed herein may be more easily and cheaply manufactured than equivalent power plants of the prior art, and have less elements requiring maintenance, attention and care. These features, plus others including novel lubricant and cooling means, combine to provide constructions which are highly important and beneficial contributions to the art.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description, and all changes which come within the meaning and range of equivalency of the claims are therefore intended to be embraced therein.

What is claimed and desired to be secured by United States Letters Patent is:

1. A vortical flow gas turbine power plant comprising a duct having an inlet end and an outlet end for admitting and discharging a confined stream of gases, a rotor assembly mounted in said duct including single element, vortical flow compressor means adapted to compress and impart monotonically increasing tangential velocity to gases admitted by said inlet and single element vortical flow turbine means adapted to monotonically decrease said tangential velocity and spaced apart from said compressor means to define with said duct a combustion chamber therebetween, means to centrifugally inject fuel into said combustion chamber to mix with compressed gases from said compressor means, means to ignite the resulting fuel-gas mixture to produce combustion in said combustion chamber, means secured to said rotor assembly downstream of said ignition means to form sheltered combustion zones in said combustion chamber to maintain stable combustion therein whereby the combustion gases move through said combustion chamber in a vortical pattern about the axis of said rotor assembly and pass through said turbine means giving rotational movement thereto.

2. A turbine power plant as defined in claim 1, wherein said fuel injecting means comprises a plurality of fuel nozzles formed in said compressor means.

3. A turbine power plant as defined in claim 1, wherein said fuel injecting means comprises a plurality of fuel nozzles formed in said turbine means.

4. A turbine power plant as defined in claim 1, wherein said fuel injecting means comprises a plurality of fuel nozzles formed in each of said compressor means and said turbine means.

5. A turbine power plant as defined in claim 4, wherein said rotor assembly includes a fuel receiving chamber adjacent each end thereof for respectively feeding fuel to said fuel nozzles formed in said compressor and turbine means.

6. A turbine power plant as defined in claim 1, wherein said means forming sheltered combustion zones are flameholders rotatable with said rotor assembly.

7. In a vortical flow gas turbine power plant, a rotor assembly comprising a rotatable shaft, a single element vortical flow compressor secured to said shaft for rotation therewith adjacent the upstream end thereof, a plurality of flameholders secured to said shaft for rotation therewith adjacent the downstream side of said compressor, and a single element vortical flow turbine secured to said shaft for rotation therewith adjacent the downstream end thereof.

8. A turbine power plant as defined in claim 7, wherein said rotor assembly includes a streamlined shell surrounding said shaft to provide a streamlined gas flow surface and a relatively low temperature zone around said shaft.

9. In a jet engine, a fixed duct having inlet and outlet ends for admitting and discharging a stream of gases passing therethrough at high velocity, a plurality of support members mounted in each of said inlet and outlet ends of said duct, a rotor assembly supported by said support members having compressor means adapted to compress gases admitted in said inlet and impart a vortical motion having a monotonically increasing tangential component thereto and a rotor propulsion means spaced from said compressor means to define a combustion space therebetween in said duct, means to centrifugally inject fuel into said combustion space to mix with the vortically flowing gases from said compressor, means to ignite the resulting fuel-gas mixture to initiate combustion in said combustion chamber, means rotatable with said rotor assembly forming sheltered combustion zones in said combustion chamber to maintain stable combustion therein whereby the combustion gases move through said combustion chamber in vortical paths about the axis of said rotor assembly and pass through said rotor propulsion means to impart rotational movement thereto and issue therefrom in a jet stream, a diffuser member secured to said support members in the inlet end of said duct, a nozzle member secured to said support members in the outlet end of said duct, and casing members slidably mounted on each end of said duct for coaction with said diffuser and nozzle members to respectively regulate the areas of the gas passages at the inlet and outlet ends of said duct.

References Cited in the file of this patent
UNITED STATES PATENTS

| Number | Name | Date |
|---|---|---|
| 2,066,452 | Bernard | Jan. 5, 1937 |
| 2,256,198 | Hahn | Sept. 16, 1941 |
| 2,272,676 | Leduc | Feb. 10, 1942 |
| 2,326,072 | Seippel | Aug. 3, 1943 |
| 2,360,130 | Heppner | Oct. 10, 1944 |
| 2,520,967 | Schmitt | Sept. 5, 1950 |
| 2,568,921 | Kroon | Sept. 25, 1951 |
| 2,569,497 | Schiesel | Oct. 2, 1951 |
| 2,570,629 | Anxionnaz et al. | Oct. 9, 1951 |
| 2,579,049 | Price | Dec. 18, 1951 |
| 2,607,191 | Lee | Aug. 19, 1952 |
| 2,620,623 | Imbert | Dec. 9, 1952 |
| 2,640,314 | Abel | June 2, 1953 |
| 2,659,196 | Brown | Nov. 17, 1953 |
| 2,665,549 | Newcomb | Jan. 12, 1954 |

FOREIGN PATENTS

| Number | Country | Date |
|---|---|---|
| 404,484 | France | Oct. 21, 1909 |
| 745,590 | France | Feb. 21, 1933 |